March 17, 1931.  T. CAPPARELLA  1,797,071
LEAK GAUGE
Filed May 13, 1927

THOMAS CAPPARELLA
INVENTOR
BY Victor J. Evans
ATTORNEY

Patented Mar. 17, 1931

1,797,071

UNITED STATES PATENT OFFICE

THOMAS CAPPARELLA, OF NEW YORK, N. Y.

LEAK GAUGE

Application filed May 13, 1927. Serial No. 191,160.

This invention relates to improvements in leak gauges and has particular reference to a leak gauge for pneumatic valves.

The primary object of the invention resides in a gauge which is most sensitive in its action to detect and record any leak which may be present in pneumatic tire valves.

Another object of the invention is to eliminate the present method of detecting a leaky air valve which necessitates the wetting of the outlet of the valve, and if a leak is present the same will produce a bubble. This practice is unsanitary as a person in conducting such a test often places his finger to his mouth to transfer saliva to the valve for wetting the same.

A further object is the provision of an air pressure leak gauge which is extremely simple of construction and consequently inexpensive of manufacture, and easy to apply to a tire valve for testing the same.

With these and other objects in view, the invention resides in certain novel construction and combination and arrangement of parts, the essential features of which are hereinafter fully described, are particularly pointed out in the appended claim, and are illustrated in the accompanying drawing, in which:—

Figure 1:
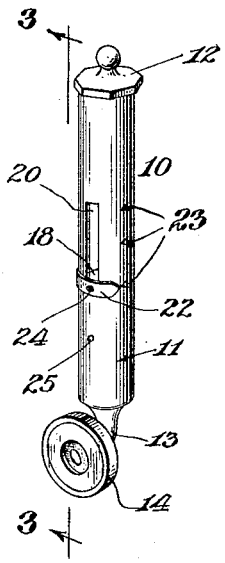
Figure 1 is a perspective view of my improved leak gauge.
Figure 3:
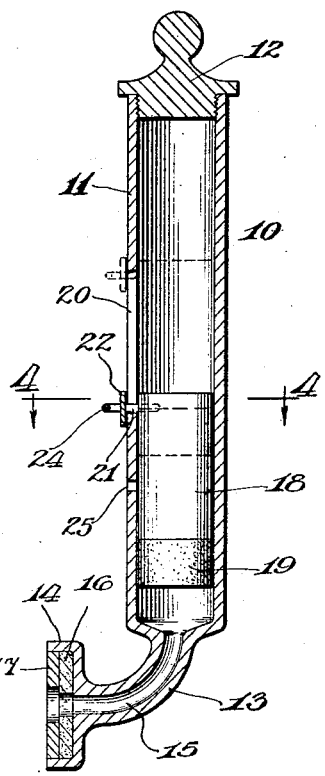
Figure 3 is a vertical sectional view on the line 3—3 of Figure 1 and showing the indicator in an indicating position in dotted lines.
Figure 2:
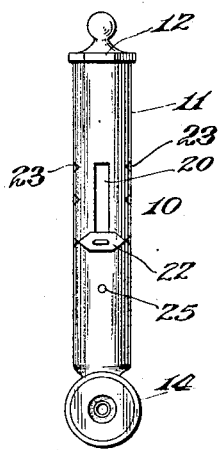
Figure 2 is a front elevation of the same.
Figure 4:
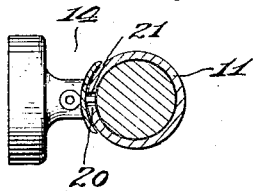
Figure 4 is a horizontal sectional view on the line 4—4 of Figure 3.

Referring more particularly to the drawing, the reference numeral 10 designates my improved gauge in its entirety which includes a tubular casing or cylinder 11 which is closed at one end by a removable cap 12 having a square cornered tool receiving portion, while its opposite end is reduced and curved at an angle to provide a neck or elbow 13. The free end of the elbow is enlarged to provide a cup 14 while a restricted passage 15 leads from the casing or cylinder to the cup. A leather washer 16 is seated within the cup and an outer metal washer 17 overlies the same and frictionally engages the inner peripheral walls of the cup for retaining the same therein. The washers 16 and 17 are provided with openings for register with the duct or passage 15 to provide an uninterrupted passage from the cup to the interior of the casing.

Freely slidable within the casing or cylinder 11 for a predetermined distance, is a plunger or piston 18 which is relatively light in weight and which may be constructed of part cork 19 to lighten the same.

The wall of the cylinder or casing is provided with an elongated slot 20, through which a stud 21 extends from the top of the piston. The stud carries an indicator 22 which may be colored red and which is slidable over the outside of the casing and adapted to co-act with sets of graduations 23 on the exterior thereof and which may be colored red to be clearly visible. Three sets of graduations are shown in the drawing to indicate the two extreme positions of the indicator and an intermediate position. The stud 21 is provided with a manipulating head 24 which extends outwardly from the indicator or pointer and by which the piston may be returned to normal position as it will be appreciated, that the plunger is very light and may be unable to return under its own weight.

In practice, the cup is placed over the top of pneumatic valve stem in sealing engagement therewith, with the indicator 22 at the inner end of the slot 20. Should the valve leak, even a slight amount of air, the pressure is sufficient to move the plunger or piston 18 outward toward the closed end of the casing. The indicator or pointer 22 will show the degree of the leak, that is, if the leak is a serious one, the indicator 22 will move to the outer end of the slot but if not, it will come to rest at an intermediate position. The front of the casing is provided with a bleed opening 25 which is normally sealed by the plunger 18 but which plunger uncovers the opening when the same has been moved to the limit of its outward movement to exhaust air therethrough to relieve the pressure against the plunger.

It will be appreciated that a leaky air valve cannot be detected by the present style of air gauge used for testing the air pressure of a tire, but it is believed that the herein described device will satisfactorily meet a long felt want.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

A pneumatic tire valve leak gauge comprising a tubular casing provided with a bleed opening and having a slot arranged longitudinally therein, a removable cap having a polygonal tool receiving portion and being provided for one end of said casing, an elbow for the opposite end of said casing and having a passage communicating therewith, a cup formed with the elbow, a resilient washer arranged in said cup, a metal outer washer engaging the resilient washer, said washers having openings registering with the passage, a piston mounted for slidable movement in said casing, a stud secured to said piston and passed through the slot, said casing having graduations thereon, a colored indicator secured to the outer portion of the stud and cooperating with the graduations, and a manipulating member formed with the outer end of said stud.

In testimony whereof I have affixed my signature.

THOMAS CAPPARELLA.